Jan. 9, 1968 G. O. KAPPLER 3,362,550
VEHICLE WITH BOOM
Filed Feb. 21, 1967 2 Sheets-Sheet 1
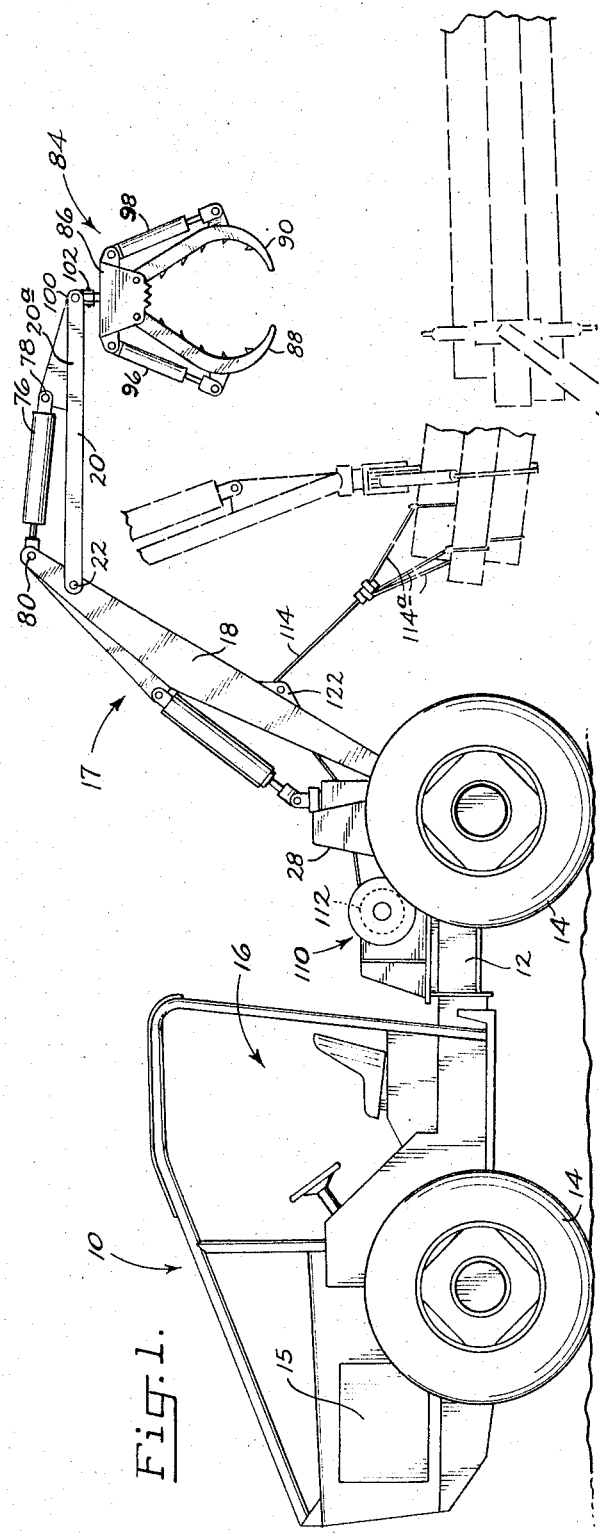
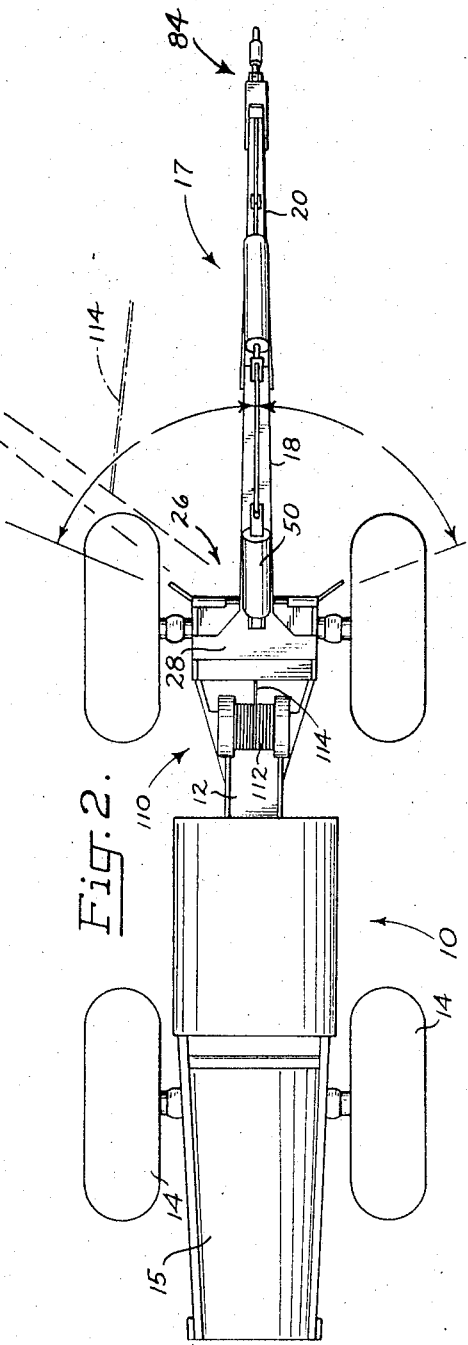
Gilbert O. Kappler
INVENTOR
BY
Kolisch + Hartwell
Attys.

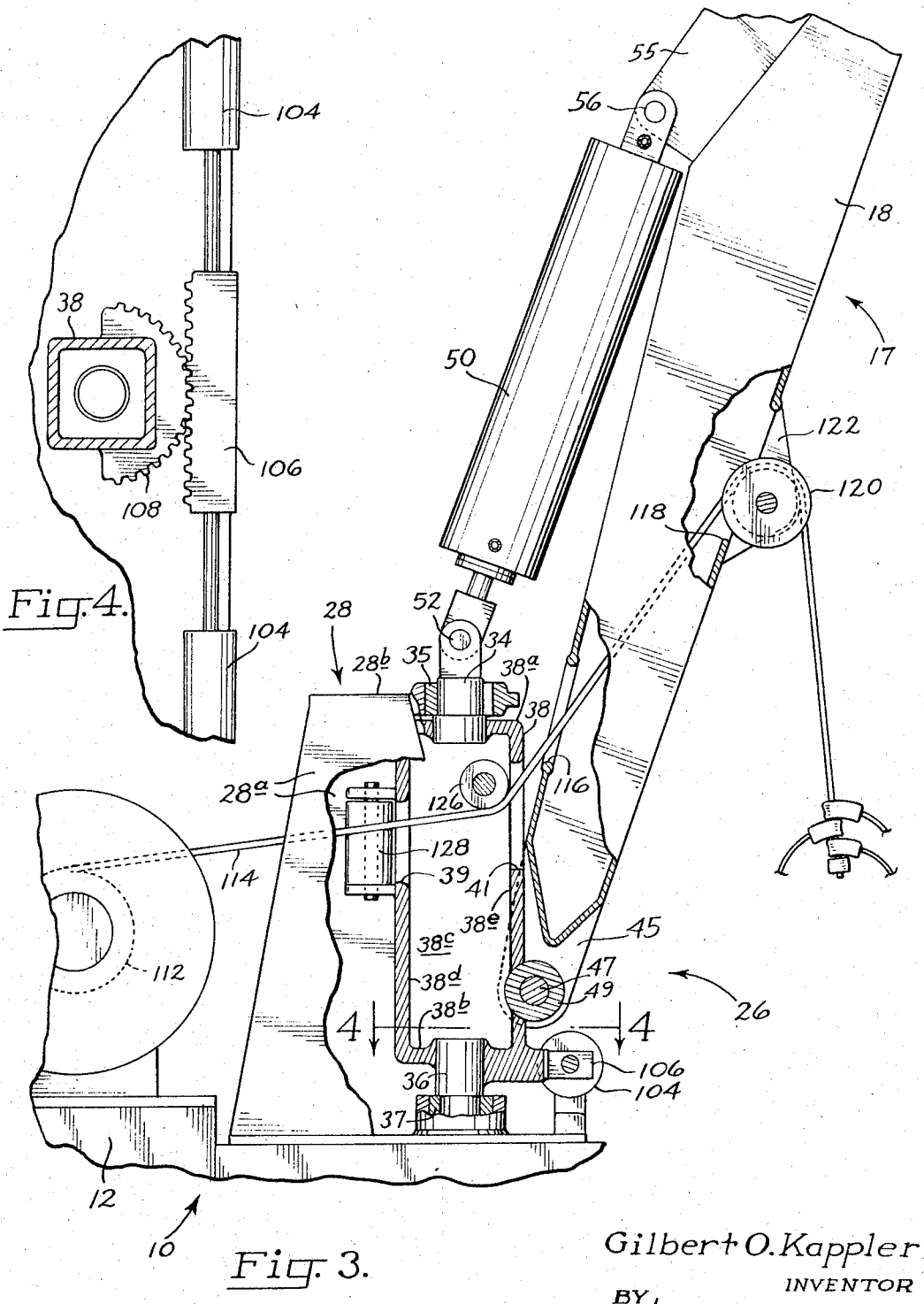

United States Patent Office 3,362,550
Patented Jan. 9, 1968

3,362,550
VEHICLE WITH BOOM
Gilbert O. Kappler, Rte. 1, Box 125,
Mulino, Oreg. 97042
Filed Feb. 21, 1967, Ser. No. 617,559
8 Claims. (Cl. 214—147)

ABSTRACT OF THE DISCLOSURE

Apparatus including a vehicle and a double section boom on the vehicle mounted for up and down and side to side swinging movement. A grapple is mounted on the outer end of the boom and a line contained on a winch mounted on the vehicle is trained through a fair lead mounted adjacent the base of the boom and another fair lead mounted on the underside of the boom between its ends with the line extending out from such other fair lead from a location under the boom.

---

The invention is a continuation in part of my prior filed application entitled, "Load Transporting Vehicle," filed Oct. 10, 1966, Ser. No. 585,536, now abandoned.

The invention relates to load-transporting apparatus comprising a vehicle and a boom on the vehicle utilized in making an attachment with a load and then transporting it.

The specific and preferred embodiment of the invention herein disclosed features a boom comprising first and second boom sections which are pivotally interconnected to permit relative swinging movement. The boom has its inner end mounted on the vehicle through means permitting swinging of the boom from side to side, and also swinging up and down to raise and lower the boom. The boom further includes control means for a line utilized in hauling loads which is mounted on the boom, and is operable to pay out and take in line from a point on the underside of the boom. A grapple mounted on the outer end of the boom provides means cooperable with the line for lifting and otherwise handling loads.

The apparatus contemplated by the invention has multiple fields of use, including the handling of logs. For instance, in the harvesting of trees, the apparatus may be used to good advantage in moving a log from the location where it was felled to a landing where it may be either decked or perhaps loaded with other logs onto a vehicle for transport. Because of the demonstrated advantages of the apparatus of the invention in the handling of logs, the invention is described herein in connection with such usage, although it should be obvious that this does not preclude the use of the apparatus in other applications where similar type problems are involved.

Generally, an object of the invention is to provide improved load-transporting apparatus including a vehicle, a boom with grapple mounted on the vehicle for movement up and down and from side to side, and novel means associated with the boom for controlling a line used in conjunction with the grapple in the handling of loads.

A vehicle according to the invention greatly facilitates handling of logs in the woods. Logs are frequently felled in rough terrain and movement of them to a location where they may be loaded for transport out of the woods entails difficulties. A vehicle according to the invention will not only move logs more efficiently, but will do so in a much safer manner for the personnel involved in the logging operation.

The invention includes as other objects and advantages the provision of novel apparatus comprising a vehicle on which is mounted a boom having a grapple, in combination with means mounted on the boom for controlling a line, which promotes new and improved methods for maneuvering logs under a wide variety of conditions, new and improved procedures for transporting logs with movement of the vehicle, and new and improved procedures for depositing logs at a landing or other location.

As more specific objects, the invention contemplates improvements in the mounting of the base of a boom in an organization of the type described, and improvements in the means whereby line or cable is trained from a winch to a point located on the boom on the underside of the boom whence the line extends outwardly most effectively to be utilized in conjunction with a grapple on the boom as an instrumentality for the attachment to a log or other load.

These and other objects and advantages are attained by the invention which is described hereinbelow in conjunction with the accompanying drawings wherein:

FIG. 1 is a side elevation illustrating portions of a vehicle with boom constructed according to a specific embodiment of the invention, and showing in dashed outline how the apparatus may be employed to transport logs with movement of the vehicle;

FIG. 2 is a plan view of the apparatus shown in FIG. 1 and illustrating in dashed outline another use of the apparatus;

FIG. 3 is a view, on a somewhat enlarged scale and with portions broken away, illustrating details of the mounting for the base of a boom in the apparatus; and FIG. 4 is a cross-sectional view, on the same scale as FIG. 3, taken along the line 4—4 in FIG. 3.

Referring now to the drawings, and first of all and more particularly to FIGS. 1 and 2, a vehicle is shown at 10 of the type that might be used for transporting logs from where they are felled to a landing. Vehicle 10 includes a vehicle frame such as that shown at 12 and wheels supporting the frame for movement over the ground shown at 14. While the vehicle illustrated is shown with pneumatic-type tires or wheels, it should be obvious that other types of wheel arrangements might be employed, as in a crawler-type vehicle, wherein an endless track is provided which is trained over wheels. The vehicle includes the usual engine 15 for powering the wheels, and an operator's station 16 provided with the usual steering mechanism and engine controls.

Projecting outwardly from the rear end of the vehicle is an elongated boom, indicated generally at 17. Boom 17 comprises a pair of boom sections 18, 20 which have an adjacent set of ends pivotally interconnected by pivot means 22.

Referring now also to FIGS. 3 and 4, a mounting means designated generally at 26 mounts the base of the boom, more specifically the base of boom section 18, in such manner as to provide for swinging or swiveling of the boom from side to side about an upright axis, whereby the outer or free end of the boom may be swung laterally to one or the other side of the vehicle, and swinging of the boom up and down about a substantially horizontal axis, thus to raise and lower the outer end of the boom.

Specifically describing this mounting means, a swing frame support 28 is affixed to and extends upwardly from the vehicle frame adjacent its rear end. The swing frame support includes opposed sides 28a and a top 28b. Within the spaced bounded by the top and sides of the swing frame support there is a swing frame 38.

Swing frame 38 is a hollow boxlike structure, including top 38a and bottom 38b, and extending between the top and bottom there are opposed sides such as side 38c shown in FIG. 3 (the near side having been removed in FIG. 3). The swing frame further includes front and rear walls 38d, 38e, which are apertured to include openings at 39 and 41 to enable the passage of a line through the swing frame.

The swing frame is journaled within support 28 for swiveling or swinging about a vertical axis. Thus, joined to top 38a is a journal portion 34 which has an upper extremity received within bearing 35 mounted on top 28b of the swing frame support. Joined to bottom 38b of the swing frame is a journal portion 36 received within bearing 37 mounted adjacent the base of the swing frame support.

Boom section 18 adjacent its base terminates in opposed side plates such as the one shown at 45 in FIG. 3 (the near plate having been removed in FIG. 3). These side plates straddle the swing frame adjacent the swing frame's base. Pivotally connecting the base of boom section 18 to the swing frame are journal portion 47 extending between side plates 45 and joined to the side plates, and sleeve 49 which receives the journal portion and is joined to the sides of the swing frame.

The construction described connecting the base of boom section 18 to the swing frame permits up and down swinging of the boom relative to the swing frame (and thus the vehicle) about a substantially horizontal axis. The boom being mounted on the swing frame undergoes side to side swinging movement with swiveling of the swing frame in bearings 35, 37.

Raising and lowering of boom 17, by pivoting it about the axis provided by journal 47, is produced under power by actuation of an extensible device or ram 50 interposed between the swing frame and boom section 18. The ram has its top or cylinder end pivotally connected at 56 to a gusset plate 55 secured to section 18 and its extensible rod end pivotally connected at 52 to a protruding end of journal portion 34. It will be noted that with the ram connected at its lower end to the swing frame, as described, lateral swinging of the boom can take place without any extension or contraction of the ram. In other words, once the appropriate vertical position of the boom has been selected by proper actuation of the ram, such remains unaffected by subsequent lateral swinging of the boom.

The boom is swung from side to side under power through operation of rams 104 (see FIGS. 3 and 4), having cylinders mounted on the frame of the vehicle and with their rod ends connected to a rack 106 interconnecting such rod ends. A gear segment 108 is joined to the swing frame and the teeth of this gear segment mesh with the teeth of rack 106.

Referring again to FIG. 1, upper boom section 20 is swung relative to the lower boom section 18 about pivot means 22 by extension and contraction of extensible device or ram 76. This ram has its cylinder end pivotally connected at 78 to the upper boom section and its opposite or rod end pivoted at 80 to boom section 18.

A grapple or grapple mechanism 85 is mounted on the free or outer end of the boom, i.e., non-pivoted end 20a of boom section 20. The grapple includes a grapple frame 86 mounting opposed grapple jaws 88, 90. Rams 96, 98 are actuated to produce swinging movement of the grapple jaws whereby they may be moved toward each other to pick up a load or away from each other to release a load. The grapple itself is mounted on end 20a of the boom section through a mounting which accommodates swinging of the grapple about a horizontal axis substantially paralleling the axis about which the boom is vertically swingable (pivot means 100) and also swinging of the grapple about another htorizontal axis substantially perpendicular to this first-indicated axis (pivot means 102). The grapple further includes power-operated means (not shown) for turning the grapple about a substantial upright axis whereby the grapple may be set at angles relative to the boom and shifted from the substantially aligned position shown in solid outline in FIG. 2.

As discussed generally above, important features of invention reside in the provision of a line adapted to be attached to a load, such as logs, and novel means associated with the boom for controlling such line whereby the same may be most effectively used in combination with the grapple in the maneuvering and transporting of logs. Further explaining, and referring more particularly to FIGS. 1 and 2, mounted adjacent the base of the boom, and preferably mounted on the vehicle independently of the mounting of the boom, is a power-operated winch 110 including the usual drum 112 carrying a length of wire rope or other line 114 extending as windings about the drum. The usual controls are provided for the winch whereby the drum may be rotated to pay out or take in line. Line 114 is shown extending from the winch through openings 39, 41 in the swing frame. The line extends upwardly and passes through openings 116, 118 provided in the top and bottom of boom section 18, to emerge on the underside of the boom section at a point located upwardly from the base of the boom.

Means is provided on the underside of the boom for controlling the line whereby the same may be taken in or let out from a location found best to facilitate the maneuvering and movement of a log in conjunction with use of the grapple. Specifically, indicated at 120 is guide means comprising a fair lead roll or roller, journaled between opposed deflector plates such as the deflector plate shown at 122 (the near plate has been removed in FIG. 3). With the line projecting from the boom at a point spaced upwardly from the base of the lower boom section, with lateral swinging of the boom the point from which line is paid out by the fair lead roller may be shifted. With the fair lead roller located on the lower boom section 18, movement is permitted the upper boom section 20 and the grapple mounted on this boom section without affecting the position of the fair lead roller. Since the fair lead roller is elevated somewhat from the base of boom section 18, line 114 when attached to a load of logs may be used effectively to raise at least a portion of such logs from the ground.

Training line 114 between the winch and fair lead roller 120 and assisting in directing the line through the openings in the swing frame and the openings in the base of the boom, is another guide means comprising a fair lead roller 126, journaled within the swing frame having the line passing thereunder, and opposed fair lead rollers such as the one shown at 128 which are disposed vertically on either side of opening 39 (the near fair lead roller 128 has been removed in FIG. 3). With swinging of the swing frame from side to side, fair lead rollers 128 function to maintain the line in a region located centrally between the side plates of the swing frame. Roller 126 functions to guide the line where it extends in its angular course upwardly through the openings in boom section 18 toward fair lead roller 120.

Explaining how the apparatus of the invention may be operated, logs which are in the direct vicinity of the vehicle may be picked up and handled using the grapple, with placement of the grapple over a log accomplished through adjustments in the boom. The grapple may be elevated and lowered, and extended out from the vehicle, through suitable swinging of the boom relative to the frame and pivoting of the boom sections relative to each other. Furthermore, the apparatus permits handling of logs using line 114. Referring to FIG. 1, shown at 114a are a series of choker lines, which may be tightened about logs to drag the logs to the vehicle when winch 110 takes in the line. The fact that the line is taken in while traveling over fair lead 120, which is swingable laterally of the vehicle with movement of the boom, is advantageous because it enables an operator to control log movement while the logs are being drawn over the ground independently of vehicle movement.

Some important advantages of the vehicle and boom according to the invention reside in the manner in which the line and grapple cooperate to permit improved facility in the removal of logs in rough terrain where the logs have fallen in obstructed and relatively inaccessible places. Furthermore, the logs are transported much more safely from the felling site to another location such as a landing, where vehicles according to the invention can handle the logs much more expeditiously and speed up the operation of the landing.

Considering various uses of the apparatus, in extracting a log a choker line may be placed around the end thereof and the winch operated to draw in the line. Should such log strike an obstruction such as a stump or another log impeding its movement, the grapple may be lowered over the log and used to lift the log while the line continues to draw it in. With the line emanating as it does from the boom section at a point elevated from its base, the line need never pass around the boom and rub on the side thereof, regardless of the particular direction in which the boom extends out from the vehicle. Further, the line may be used to exert a lifting force on any load attached thereto, whether the boom be swung to right or left, which lifting force augments the lifting force of the grapple.

With a bundle of logs located adjacent the vehicle and attached through choker lines to line 114, the grapple is an important element in producing stability in the load when the logs are subsequently pulled over the ground by movement of the vehicle. Thus, the grapple may be lowered and attached to a bundle of logs, as shown in dashed outline in FIG. 1, to provide an additional point of attachment with the logs behind the choker lines. With such an organization, an operator is better able to control movement of the log bundle whereby it better tails the vehicle. This is important in minimizing tendencies for the vehicle to overturn as when making a turn. With the choker line attachment, each log is securely held from pulling out from between the grapple arms. Having pulled logs to the vehicle using the choker lines, subsequent attachment with the grapple is possible without the operator getting out of the vehicle.

A particularly useful application of the vehicle is in the handling of logs while operating on a steep slope, such as the side of a hill, where there is danger of overturning. The vehicle according to the invention may be operated so as to compensate for the hill. For instance, and referring to FIG. 2, assuming that the log which is to be retrieved is below and to the right of the vehicle and that the vehicle is on a slope where the incline is downwardly from the vehicle in the figure, the grapple may be swung uphill to the other side of the vehicle and attached to other logs as indictaed by the dashed outline of the grapple. With the grapple attached to logs, and the boom and grapple extending uphill, a counterbalancing weight is introduced on the uphill side of the vehicle inhibiting turning over. This movement of the boom also is effective to shift the point at which the line extends from the boom to a point on the uphill side of the longitudinal axis for the vehicle. With such use of the grapple, logs of considerable size can safely be handled in terrain where previously it was impossible to do so.

Further indicative of the advantages of the apparatus contemplated, is the greater efficiency with which logs may be unloaded at a landing where traffic is relatively heavy. In such a situation, a loader or other machine may be employed for stacking logs on a deck, or on trucks for transport to a mill. Where logs are hauled into the landing by choker lines, a man is required on the landing to unfasten these lines which is always a dangerous job, particularly at a busy landing. Unfastening choker lines takes time and frequently other vehicles traveling to the landing must wait until a vehicle occupying the landing has been freed of logs. This often results in other loaded vehicles standing idle while waiting to move into the landing. With the apparatus of the invention, a driver at some point before reaching the landing may disconnect any choker lines and grasp the logs with the grapple. The driver may then haul the logs while only held by the grapple, directly into the landing and with no delay release the logs without requiring any workman at the landing. The vehicle after log release may quickly clear the landing to permit another vehicle to discharge its load in a similar manner. In such an operation, the productivity of a number of vehicles is materially increased.

In the preferred embodiment of the invention, the winch is mounted on the vehicle independently of the mounting for the boom. In this way, a winch of considerable size may be utilized without introducing clearance problems on lateral swinging of the boom. With the winch mounted in front of the base of the boom, and a line trained as described by fair leads through the boom to emerge from the underside of the boom adjacent fair lead roller 120, the boom may be located well to the rear of the vehicle with maximum clearance provided to the rear of the base of the boom.

While a preferred embodiment of the invention has been described, as well as certain advantages, obviously such description does not exclude other features or uses to which the vehicle may be applied. Furthermore, the vehicle is subject to certain modifications, without departing from the inventive concepts disclosed herein. It is desired to cover all modifications and variations of the invention as would be apparent to one skilled in the art, and that come within the scope of the appended claims.

It is claimed and desired to secure by Letters Patent:

1. Load-transporting apparatus with grapple mechanism and independent load-hauling line comprising, in operative position; a vehicle supported for movement over the ground; a boom on said vehicle projecting outwardly therefrom; mounting means mounting the base of the boom on said vehicle accommodating horizontal swinging of the boom to permit swinging of the outer end of the boom laterally of the vehicle, and up and down swinging of the boom to permit raising and lowering of the boom's outer end; grapple mechanism swingably mounted on the boom adjacent its outer end; a line having an outer free end detached from the grapple mechanism and boom which is adapted to be fastened onto a load; and guide means on the boom for paying out said line from a location under the boom constructed to guide the line whereby it may extend out from under the boom laterally from the boom and toward either of opposite sides of the vehicle without rubbing on the boom.

2. The apparatus of claim 1 which further comprises a winch for said line mounted adjacent the base of the boom, and wherein said guide means comprises fair lead means mounted on said boom disposed toward the outer end of the boom from said winch.

3. The apparatus of claim 2 wherein said winch is mounted on the vehicle independently of said boom.

4. Load-transporting apparatus with grapple mechanism and independent load-hauling line comprising, in operative position; a vehicle supported for movement over the ground; an elongated boom comprising first and second boom sections and pivot means pivotally interconnecting an adjacent set of ends of said boom sections; means mounting one end of the boom on said vehicle accommodating swiveling of the boom about an upright axis with lateral displacement of the boom, and swinging of the boom up and down; grapple mechanism swingably mounted on the end of the boom opposite its said one end; a line having an outer free end disattached from the grapple mechanism and boom which is adapted to be fastened onto a load; guide means between the ends of the boom for guiding said line constructed to guide said line whereby it may extend out from the boom laterally from the boom and to either of the vehicle's opposite sides without rubbing on the boom; and means adjacent the boom's said one end for paying out and taking in said line with said line trained over said guide means.

5. The apparatus of claim 4, wherein the guide means between the ends of the boom for guiding a line is mounted on the first boom section at a point intermediate the means mounting one end of the boom on the vehicle and the pivot means pivotally interconnecting the first and second boom sections.

6. Load-transporting apparatus comprising a vehicle including a vehicle frame supported for movement over the ground; a boom on said vehicle projecting outwardly therefrom; mounting means mounting the base of the boom on said vehicle frame accommodating horizontal swinging of the goom to permit swinging of the outer end of the boom laterally of the vehicle, and up and down swinging of the boom to permit raising and lowering of the boom's outer end; grapple mechanism mounted on the boom adjacent the boom's outer end; a winch for a line mounted on the vehicle frame independently of the boom and adjacent the base of the boom; fair lead means mounted on said boom disposed toward the outer end of the boom from said winch for paying out a line extending from the winch from a location under the boom; and another fair lead means mounted adjacent the base of the boom which guides line where it extends from the winch to said first mentioned fair lead means, said other fair lead means guiding the line through the boom to the underside of the boom.

7. Load-transporting apparatus comprising a vehicle supported for movement over the ground; an elongated boom comprising first and second boom sections and pivot means pivotally interconnecting an adjacent set of ends of said boom sections; means mounting one end of the boom on said vehicle accommodating swiveling of the boom about an upright axis with lateral displacement of the boom, and swinging of the boom up and down, said means comprising a swing frame journaled on the vehicle for swiveling about an upright axis and pivot means pivotally connecting said one end of the first boom section to said swing frame; grapple mechanism mounted on the end of the boom opposite its said one end; guide means between the ends of the boom for guiding a line; and means adjacent the boom's said one end for paying out and taking in a line trained over said guide means comprising another guide means mounted on the swing frame for guiding a line with such line extending through the frame and thence to said first-mentioned guide means.

8. The apparatus of claim 7 wherein the means adjacent the boom's said one end for paying out and taking in a line further comprises a winch mounted on the vehicle independently of the boom, having line contained thereon, which line extends from the winch to said other guide means and thence to said first-mentioned guide means.

References Cited
UNITED STATES PATENTS

| | | | |
|---|---|---|---|
| 2,580,471 | 1/1952 | Smith | 214—132 |
| 3,120,310 | 2/1964 | Roberts et al. | 214—147 |
| 3,273,729 | 9/1966 | Holopainen | 214—138 |
| 3,281,119 | 10/1966 | Westfall | 214—147 X |

HUGO O. SCHULZ, *Primary Examiner.*